C. M. MANLY.
STEERING GEAR.
APPLICATION FILED AUG. 23, 1917.
1,389,260.
Patented Aug. 30, 1921.
2 SHEETS—SHEET 1.
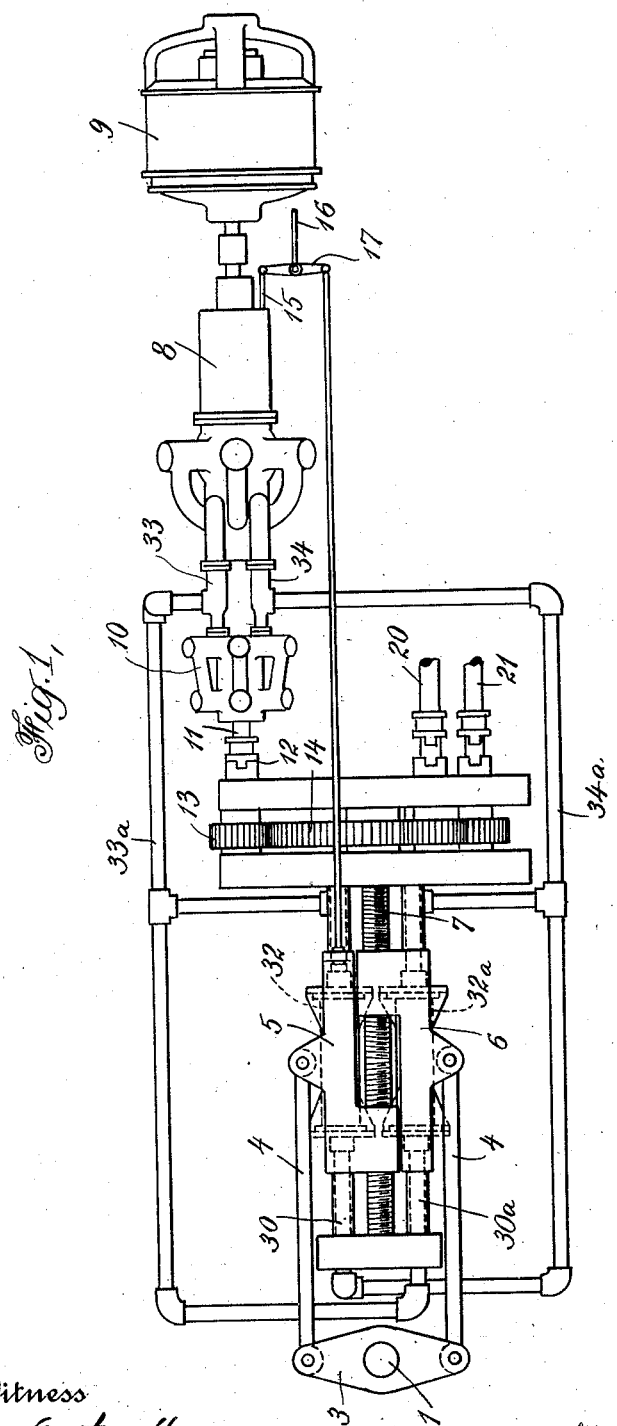

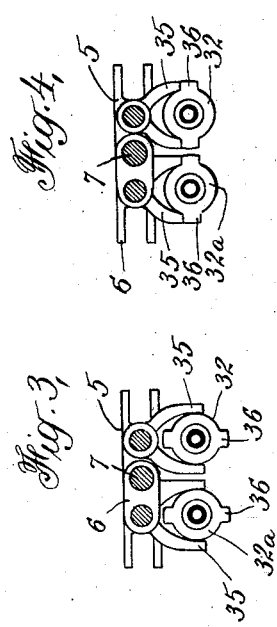
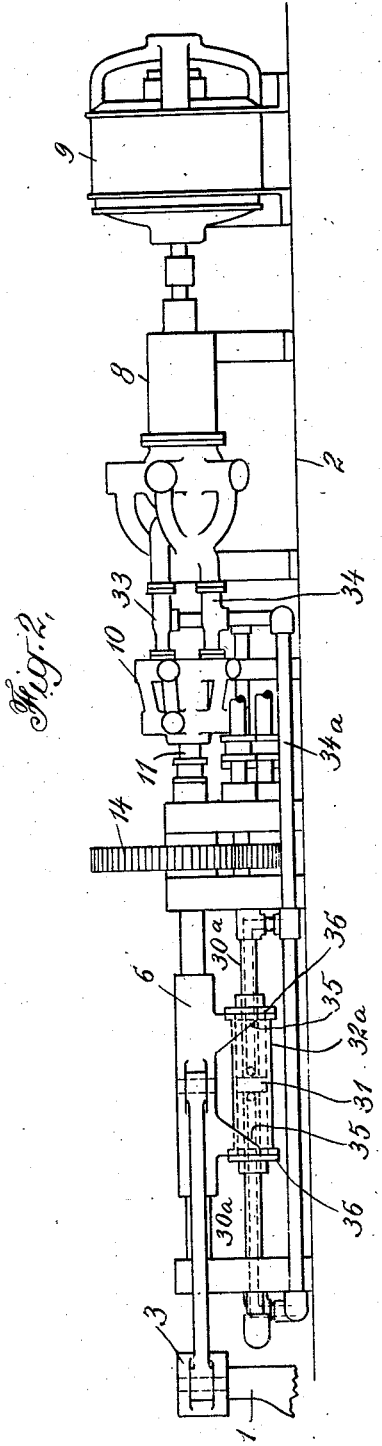

UNITED STATES PATENT OFFICE.

CHARLES M. MANLY, OF BUFFALO, NEW YORK.

STEERING-GEAR.

1,389,260. Specification of Letters Patent. Patented Aug. 30, 1921.

Application filed August 23, 1917. Serial No. 187,896.

*To all whom it may concern:*

Be it known that I, CHARLES M. MANLY, a citizen of the United States, and a resident of Buffalo, county of Erie, and State of New York, have invented new and useful Improvements in Steering-Gears, of which the following is a specification.

This invention relates to steering gear for ships, etc., and has for its object to provide a power driven gear which shall embody the advantages of the irreversible screw actuated rudder connections now commonly used for the steering gear of large ships, but which at the same time shall avoid the power losses incidental to gears of this character.

A further object of the invention is to provide a steering gear in which the rudder is primarily shifted by a directly connected hydraulic or steam cylinder, with the advantages of quick response to the helm and simplicity of design, but without the disadvantage heretofore inherent in a mechanism of this type of being reversible under the reaction of a greater pressure on the rudder than the operating pressure, whereby the steering of the boat is rendered unreliable and the parts subject to excessive strain.

A further object of the invention is to provide a steering gear embodying the advantages of direct application of power and irreversibility as above described, in which the rudder is moved in synchronism, both as regards speed and position, with the steering wheel, while using as a prime mover a continuously running motor of uniform speed thereby facilitating the use of an electric motor without danger of overload or other injury.

With the above objects in view, my invention consists primarily of a screw mechanism for moving the rudder and also reciprocating thrust cylinders connected to the rudder for simultaneous operation with the screw mechanism, both the screw mechanism and the thrust cylinder being operated from a common variable stroke pump, the pump being adapted to be driven from a suitable prime mover at a constant speed. The fluid connections between the pump and the thrust cylinders and the motor for operating the screw mechanism will be such that the thrust cylinders primarily effect the operation of the rudder, the motor driving the screw mechanism merely consuming sufficient power to rotate the screw as the load is relieved by the thrust cylinders.

In the accompanying drawings, I have illustrated a preferred practical embodiment of my invention, and in said drawings, Figure 1 is a plan view showing my improved steering gear;

Fig. 2 is a side elevation of the mechanism shown in Fig. 1; and

Figs. 3 and 4 are detail views which will be later described.

Referring to the drawings, 1 indicates the rudder post of the ship, whose deck-line is indicated at 2 in Fig. 2. The rudder post is provided on its upper end with a cross arm 3 to whose opposite ends are connected the links 4, by which the rudder is actuated. To the opposite ends of the links 4 are connected oppositely positioned nuts 5 and 6 respectively, working on a screw 7 whose ends are oppositely threaded, as shown in Fig. 1, so that when the screw is rotated the nuts 5 and 6 will be moved toward or away from each other, according to the direction of rotation of the screw. On such movement of the nuts, the rudder will be turned in one direction or the other, both links 4 being operative, one pushing and the other pulling, according to the direction of rotation of the screw.

The mechanism so far described is a standard form of steering gear which is generally accepted as the most reliable because of the irreversibility of its screw connections and the simple positive connection between the screw and the rudder. For actuating the screw 7 I have provided in the preferred embodiment of my invention which is described in the drawing, a hydraulic variable speed gear of the type shown in my prior Patent No. 801,097, dated October 3, 1905, and in my copending application No. 639,464. This mechanism consists briefly of a variable stroke pump 8 continuously driven from an electric motor 9, or other prime mover, and connected through a closed fluid circuit with a hydraulic motor 10 whereby the shaft 11 of the motor will be driven at varying speeds, depending on the length of pump stroke.

The shaft 11 is connected to the screw 9 by means of a clutch 12 through which a large gear 14 on the end of the screw 7 is driven by means of an intermediate gear 13. The stroke of the pump is controlled by means of a rod 15 in such manner that the extent of adjustment of the rod on opposite sides of its central neutral position determines the length of pump stroke. The rod 15 is actuated by link 16 connected in any suitable manner, not shown, to the steering wheel. The link 16 is connected to the rod 15 by a floating lever 17 attached at its middle point to the link 16 and at its ends to the rod 15 and the nut 5, respectively. By means of this construction, upon actuation of the link 16 by the steering wheel, the lever 17 will turn on its connection with the nut 5 as a fulcrum and shift the rod 15 in the same direction as the link 16, whereby the hydraulic motor will be set in motion at a speed which will gradually increase at a rate corresponding to the speed of movement of the steering wheel. As soon as the hydraulic motor is set in motion the screw 7 will be turned and the nuts 5 and 6 actuated longitudinally. Longitudinal movement of the nut 5 acts through its connection with the lever 17 to move the lever in the opposite direction to that effected by the steering wheel, so that when the speed of movement of the hydraulic motor corresponds with the speed of the steering wheel the stroke of the hydraulic pump will not be further adjusted and the hydraulic motor will continue in motion at a uniform speed. When the rudder has been adjusted to the desired position, the movement of the steering wheel will be stopped and the continuing movement of the nut 5 will cause the lever 17 to turn on its connection with the link 16 as a fulcrum and rapidly turn the rod 15 to its zero position, thereby stopping the rudder and holding it in its adjusted position by means of the irreversible screw 7.

The mechanism so far described constitutes a complete steering gear, although there is usually associated with such gear an auxiliary power mechanism, which I have indicated merely by the shaft 20, for use in case the hydraulic mechanism is disabled, and also an auxiliary shaft 21 which may be hand-operated in case both the devices are disabled. These shafts are provided with suitable clutches whereby they are normally inoperative but may be brought into action when necessary.

The steering gear of the construction described is entirely successful in operation, but is open to the objection that because of the low mechanical efficiency of the screw gear it consumes a much larger amount of power than necessary for the actual shifting of the rudder. The principal object of my present invention is to obtain all the advantages of this screw gear, but at the same time obviate the friction loss in the transmission whereby the horse power of the prime mover may be reduced to less than one third of the horse power which has heretofore been necessary. To this end I place beneath the nuts 5 and 6 and parallel therewith, fixed hollow shafts 30, 30ª, respectively, to each of which is attached at a point corresponding with the middle of the screw 7, a solid piston 31. The pistons 31 work in the cylinders 32, 32ª which surround the shafts 30, 30ª, and are slidably mounted on said shafts and actuated by fluid pressure from the hydraulic pump, as will now be described.

The shafts 30, 30ª, whose bores are divided at the center, are provided on each side of the pistons 31 with transverse bores connecting the longitudinal passages of the shafts with the opposite ends of the cylinders. Leading from each of the pipes 33, 34 forming the connection between the pump and motor of the hydraulic gear, are branch pipes 33ª, 34ª, respectively, the pipe 33ª being connected to the shaft 30 below the nut 5 at the end adjacent the gear 14, and to the shaft 30ª below the nut 6 at the end adjacent the rudder. The pipe 34ª is similarly connected to the shaft 30ª below the nut 6 at the inner end, and to the shaft below the nut 5 at the outer end, whereby when fluid pressure is generated in the hydraulic gear, the cylinders 32, 32ª, will be shifted in the same directions respectively as the screw 7 tends to move the nuts 5 and 6. The nuts 5 and 6 are connected to their cylinders 32, 32ª by forks 35 depending from each nut near each end thereof. The prongs of the forks embrace the cylinders and the two forks of each nut are spaced apart to fit between lugs 36 projecting from opposite sides of the cylinders adjacent their ends. By turning the cylinders around their shafts, which may be accomplished with very little power, the cylinders may be locked to the nuts or may be disconnected therefrom if it is desired to operate the steering gear through means of the shafts 20 or 21.

When the rudder is to be actuated by the hydraulic gear the cylinders 32, 32ª are connected to their respective nuts and the steering wheel operated just as described above. When the pump is set in motion, fluid under pressure will be delivered to one or the other of the pipes 33, 34, from which it will tend to pass both into the rotary motor 10 and the corresponding ends of the cylinders 32, 32ª. As the motor 10 and the cylinders 32, 32ª are connected in parallel, it is obvious that the fluid will tend to pass into whichever offers the least resistance to movement. Hence, by having the motor 10 quite small, and the cylinders 32 large, practically all the work of shifting the rudder will fall on the cylinder 32, the motor 10 merely serving to turn the screw 7 as the pressure on its threads is relieved by the action of the cylinders 32.

As stated above, the friction loss of the screw gear is about 75% of the power applied, and as friction is directly proportional to the pressure of the engaging parts, it is obvious that by relieving this pressure through the directly-acting and practically frictionless hydraulic cylinder, the friction loss may be reduced to merely the rubbing contact of the lightly rotating parts. The screw mechanism loses none of its advantages of irreversibility, etc., in my construction, but on the contrary is relieved from wear so as to be practically indestructible. Moreover, the pressure in the cylinders tends constantly to relieve the screw thread of pressure so that the force of the reaction against the rudder is reduced to a corresponding extent and all danger of breakage from sudden shock is practically eliminated.

The ordinary fit of the threads on the nuts 5 and 6 on the screw shaft will allow sufficient lost motion between the thrust cylinder and the rotary motor for the cylinders to relieve the pressure on the threads in advance of the rotary movement of the screw shaft, but if desired, a positive lost motion may be provided by counter-boring the nuts 5 and 6 at their bearing on the shaft and inserting threaded sleeves having a slight lost motion connection with the body of the nut itself.

The mechanism many obviously be otherwise modified, but I prefer the simple, directly connected construction above described.

I claim.

1. In a steering gear, the combination of a reciprocating rudder-operating part, a reciprocating power-driven member connected thereto for operating said part throughout its amplitude of movement, a screw for also operating said reciprocating part, and power operated means for rotating said screw simultaneously with the application of power to said reciprocating power-driven member.

2. An irreversible power-transmitting mechanism comprising a driven part, a reversible power-actuated member operatively connected to said part, an irreversible screw also having connection with said part, and power operated means for rotating said screw simultaneously with the application of power to said reversible power-actuated member.

3. A power-transmitting mechanism for transmitting power in opposite directions comprising a driven part, a directly connected fluid pressure actuated member for shifting said part in opposite directions, a power operated auxiliary driving mechanism for said part comprising an irreversible driving member, and means for simultaneously operating said drying devices in such manner that the fluid pressure actuated part acts in advance of the auxiliary mechanism to substantially relieve the latter of the driven load.

4. A power-transmitting mechanism for transmitting power in opposite directions comprising a driven part, a directly connected fluid pressure actuated member for shifting said part in opposite directions, an auxiliary driving mechanism for said part comprising an irreversible driving member, fluid pressure mechanism for operating said irreversible driving means, and means for simultaneously applying fluid pressure to both said mechanisms.

5. A power transmitting mechanism for transmitting power in opposite directions comprising a driven part, a directly connected fluid pressure actuated member for shifting said part in opposite directions, an auxiliary driving mechanism for said part comprising an irreversible driving member, a source of fluid pressure, and connections in parallel between said source of pressure and each of said mechanisms whereby the mechanism offering the least resistance will be actuated in advance of the other mechanism.

6. In a power-transmitting mechanism, the combination of a reciprocating part to be operated, a power cylinder, direct connections between the driving member of said cylinder and said part, an irreversible screw threaded in said part, and power operated means for simultaneously rotating said screw and supplying fluid pressure to said cylinder.

7. In a power-transmitting mechanism, the combination of a reciprocating part to be operated, a power cylinder, direct connections between the driving member of said cylinder and said part, an irreversible screw threaded in said part, means for simultaneously rotating said screw and supplying fluid pressure to said cylinder, said means comprising a hydraulic motor, and a common source of fluid pressure for said motor and power cylinder.

8. In a power transmitting mechanism, the combination of a reciprocating part to be operated, a power cylinder, direct connections between the driving member of said cylinder and said part, an irreversible screw threaded in said part, means for simultaneously rotating said screw and supplying fluid pressure to said cylinder, said means comprising a hydraulic motor having operative connection with said screw, and a variable stroke pump having fluid transmitting connections with both said motor and said power cylinder.

9. In a power transmitting mechanism, the combination of a reciprocating part to be operated, a power cylinder, direct connections between the driving member of said cylinder and said part, an irreversible screw threaded in said part, means for simultaneously rotating said screw and supplying fluid pressure to said cylinder, said means comprising a hydraulic motor having operative connection with said screw, and a variable stroke pump having fluid transmission connections with both said motor and said power cylinder, said connections being in parallel, whereby the pressure from said pump will operate either the cylinder or motor in advance of the other, depending upon their relative resistance.

10. In a steering gear the combination of a rudder yoke, oppositely movable nuts for shifting said yoke, screw mechanism for operating said nuts, reciprocating driving members connected to said nuts, and means for simultaneously rotating said screw and reciprocating said members.

11. In a steering gear the combination of a rudder yoke, oppositely movable nuts for shifting said yoke, screw mechanism for operating said nuts, power cylinders connected to said nuts, and means for simultaneously rotating said screw and supplying operating pressure to said cylinders.

12. In a steering gear the combination of a rudder yoke, oppositely movable nuts for shifting said yoke, screw mechanism for operating said nuts, power cylinders having reciprocating driven parts attached to said nuts, a hydraulic motor for operating said screw mechanism, and means for simultaneously supplying said power cylinders and hydraulic motor with fluid pressure.

13. In a steering gear the combination of a rudder yoke, oppositely movable nuts for shifting said yoke, screw mechanism for operating said nuts, power cylinders having reciprocating driven parts attached to said nuts, a hydraulic motor for operating said screw mechanism, and means for simultaneously supplying said power cylinders and hydraulic motor with fluid pressure, said means comprising a variable stroke pump having operative connections between the stroke-varying means and the wheel or helm of the vessel.

14. In a steering gear the combination of a rudder yoke, oppositely movable nuts for shifting said yoke, screw mechanism for operating said nuts, power cylinders having reciprocating driven parts attached to said nuts, a hydraulic motor for operating said screw mechanism, and means for simultaneously supplying said power cylinders and hydraulic motor with fluid pressure, said means comprising a variable stroke pump having operative connections between the stroke-varying means and the wheel or helm of the vessel, said connections comprising a differential mechanism connected to a driven part of said steering gear for shifting the stroke-varying member in opposition to the movement effected by the steersman to maintain the operation of the rudder in synchronism with the helm or wheel.

Signed at Buffalo, in the county of Erie and State of New York, this 29 day of March, 1917.

CHARLES M. MANLY.